July 26, 1966     W. R. STEWART ET AL     3,262,549

LATTICE CONVEYOR

Filed Aug. 27, 1964     2 Sheets-Sheet 1

Inventors:
William Rennie Stewart
and
David Bruce Stewart
BY Baldwin & Wight
Attorneys

United States Patent Office 3,262,549
Patented July 26, 1966

3,262,549
LATTICE CONVEYOR
William Rennie Stewart and David Bruce Stewart, Dundee, Scotland, assignors to William R. Stewart & Sons (Hacklemakers) Limited, Dundee, Scotland, a corporation of the United Kingdom
Filed Aug. 27, 1964, Ser. No. 392,493
Claims priority, application Great Britain, Aug. 30, 1963, 34,395/63
9 Claims. (Cl. 198—178)

This invention relates to lattice conveyors. More particularly the invention is concerned with a lattice conveyor, hereinafter referred to as a lattice, as used for handling fibres.

Hitherto a textile lattice has been made up of a number of leather belts covered with a surface layer of canvas to which are attached at intervals transverse ribs of wood, termed lattice staves, which carry pins to retain the fibres.

While this construction of lattice has proved satisfactory for many years it has a number of disadvantages namely that; should it be necessary to effect a repair, the operation involves removing a number of rivets by which the lattice staves are attached to the belts; the heads of the rivets on the underside of the leather belts wear away through contact with the driving rollers, resulting in a stave becoming detached; the staves, themselves being of wood are easily broken or split, and also tend to warp and twist in use.

It is among the objects of the present invention to avoid or substantially reduce the above disadvantages and to provide an improved lattice which is of simple but robust construction.

According to the present invention the lattice is made up of rigid strips termed "staves," which are slotted along two opposite edges to receive a flexible connecting link, each link being adapted for disconnectible engagement with the slots in adjacent strips so that if necessary it can be readily removed and replaced.

Satisfactory results may be obtained by making the stave from light metal alloy, one of the advantages of which, in addition to lightness, strength and rigidity, is that it can be made as an extrusion.

It is preferred to construct the link from a plastic material, e.g. polythene, nylon.

In one arrangement the staves may be provided with key-hole section slots along each edge with which slidably engage corresponding shoulders formed along each edge of the links. The staves on the upper side may be formed with a longitudinally extending rib and may be provided at intervals with upstanding pins or fingers to locate the fibres. The underside of each stave may be slightly concave to conform to the curvature of the support rollers.

In another arrangement the links have spring engagement with the slots in the staves.

The invention as illustrated in the accompanying drawing as applied to a lattice conveyor for handling fibres in which.

Figure 1:
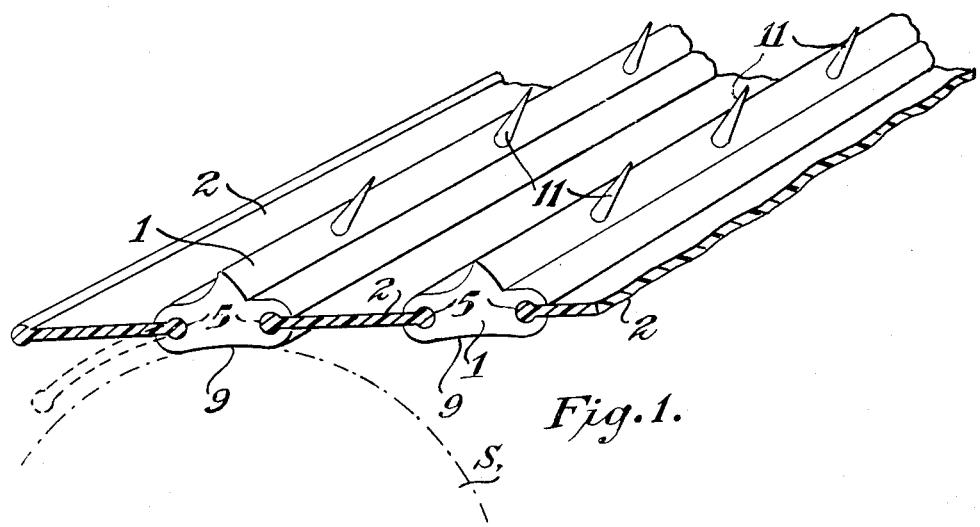
FIGURE 1 is a diagrammatic perspective view of a conveyor in accordance with the invention.

Referring first to FIGURE 1 of the drawings, the conveyor, which is supported at its ends on driving rollers or sprockets, one of which is at S is made up of staves 1 formed of rigid strip interconnected by flexible links 2. By using a metal such as aluminum for the manufacture of the staves, or a light metal alloy it has the advantage that the strip from which the staves are cut to the required width can be made by extrusion. The connections between the staves and links are such that a stave can readily be disconnected from its adjacent links for renewal or replacement and it will be seen that the underside of each stave is slightly concave as at 9 to conform to the curvature of the support rollers.

Figure 2:
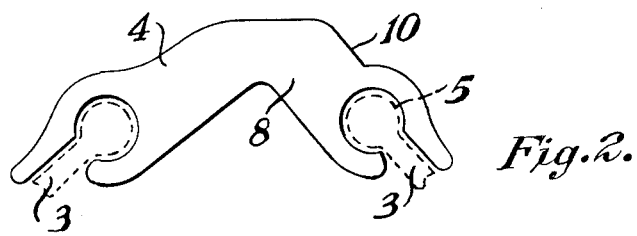
FIGURES 2 and 3 are end on views showing respectively a strip or stave and its associated flexible link in accordance with two alternative embodiments of the invention.
Figure 3:
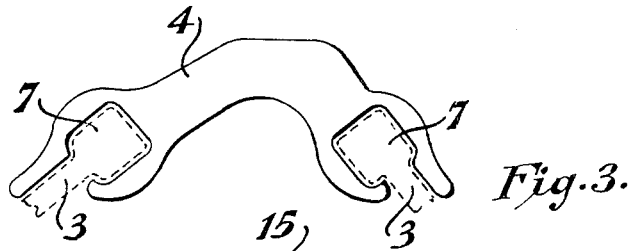
Figure 4:
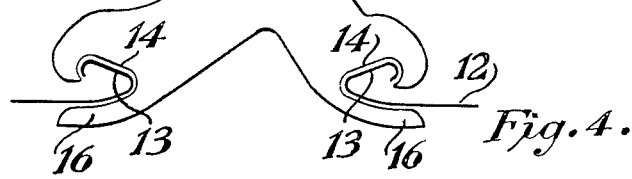
FIGURES 4, 5, 6 and 7 are views similar to FIGURES 2 and 3 showing alternative designs of stave and their connecting links, the links being formed of spring metal.

In the arrangement shown in FIGURES 2 and 3 the connecting links 3 are preferably formed of plastic material and the staves 4 are of aluminum alloy, the staves 4 conveniently being formed by extrusion.

The connection between the ends of adjacent staves and links is provided by male and female components, the links 3 being formed with a shouldered end or rib 5 constituting the male component for engagement with a slot this slot extending across the entire width of each edge of the stave 4. This construction enables the staves and links readily to be joined to one another by sliding the rib end 5 of the link 3 into the end of the slot within which it is a relatively tight or friction fit. As a result, it is a simple matter to interpose a new slat or link, should one become damaged.

In the construction shown in FIGURE 2 the interconnecting shoulder and socket are of circular section which permits limited relative movement. In order however to eliminate such movement and thus reduce any tendency to wear, the slot in the ends of the stave may be of rectangular section as indicated at 7 in FIGURE 3. As seen in end view the staves are of right angular section, the distance between the connecting centres being approximately 1": the shorter limb, indicated at 8, on the leading side or edge being formed with a flat surface 10 in which are formed holes for pins 11, see FIGURE 1, by which the fibres are engaged.

The short limb or leg 8 of the stave has an angular set slightly in excess to that of the longer leg i.e. it subtends an angle to the tangent to the curve of the roller which is greater than that of the other limb in order to give the required angle to the pin.

This arrangement of the two unequal angles in the legs offers the possibility of fitting pins at a different angle in the longer leg, thus giving a choice of two angles of pins.

Referring now to FIGURES 4 to 7, there is shown a modified design of conveyor in which the flexible links 12 are formed of spring steel. The ends of each link 12 are bent upwardly and inwardly as indicated at 13 in FIGURE 4 to form a contractile head for spring engagement with a correspondingly shaped slot 14 along each edge of the stave 15. In this case the entrance to the slot is formed at the side to the link and in order to prevent rubbing between the tongue 16 in passage over the rollers S the latter may be provided with an antifriction tread e.g. of leather.

The spring connection between the staves and links will be found of advantage where due to the width of the conveyor which may be considerable it would be difficult due to friction to slide them into position.

Moreover the springing action tends to hold the links and staves more firmly in position relative to one another and eliminates the possibility of inadvertent relative displacement under operating conditions.

Figure 5:
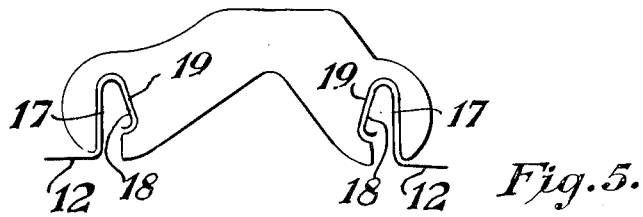

Referring now to FIGURE 5, the flexible link 12 is formed with a flanged end 17 having a downwardly bent limb 18, the contractile head so formed engaging in a vertical slot 19 in the stave. This arrangement has the advantage that direct contact between the stave and the rollers is prevented since on passage thereover, the link 12 only can make contact with it.

Figure 6:
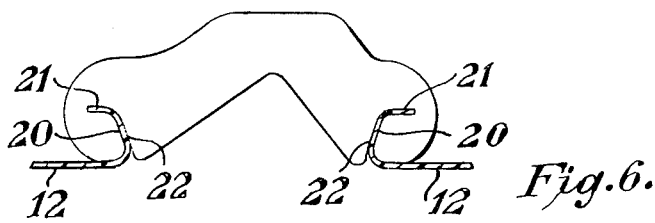
Figure 7:
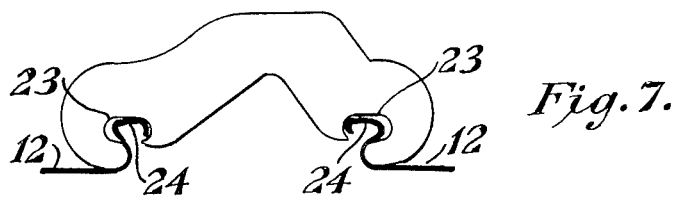

FIGURE 6 is a variation of the arrangement shown in FIGURE 5 in which the end of the link 12 is formed with a flange 20 having an inturned lip 21 for engagement with a slit 22 in the end of the stave. FIGURE 7 shows a further alternative similar to the arrangement in FIGURE 5 in which slots 23 in the underside of each stave are offset vertically to eliminate any direct contact with the rollers and the ends of each link 12 are of S formation, the upper limb of the S being indicated at 24 so as to fit the slot 23.

It will be seen that the staves due to their cross section possess inherent stability over their entire width but at the same time by reason of the flexibility of the connecting links the conveyor has all the advantages of existing forms of lattice conveyor without its defects due to wear and tear.

When assembled, the light alloy stave strips and flexible links form a complete chain with no open spaces between the staves, thus obviating the need for a canvas backing-sheet. They are also strong enough to take the drive, thus eliminating the necessity for separate leather belts.

By its construction, the lattice as now proposed is inherently rigid across its width, but is flexible in a lengthwise direction to permit of bending round the driving roller. It can also readily be made to any normally required width, simply by cutting the staves and links to a length equivalent to the width specified.

In the construction used hitherto the canvas backing sheet had to be obtained in the necessary width, or cut and hemmed throughout its length.

Thus, it will be seen that the present invention considerably simplifies the construction of lattice conveyors and reduces to a minimum the number of materials required while improving the structure and the versatility thereof.

What is claimed is:

1. In a lattice conveyor for handling fibre, the combination of a series of conveyor staves, each stave being of metal and having on its surface fibre locating pins, said stave having connector slots along its opposite edges; and connecting links formed of spring material, by which the staves are flexibly connected to one another, said links having an edge section for sliding and resilient locking engagement with the slots in the staves.

2. In a lattice conveyor for handling fibre, the combination of a series of conveyor staves, each stave being formed as a rigid metal section and having on its upper surface fibre locating pins, said metal sections being provided along its opposite edges with slots; and connecting links of spring metal, each link having along its opposite edges a contractile lip for resilient locking engagement with a slot in the stave and by which it is detachably secured thereto.

3. In a lattice conveyor for handling fibres, the combination of a series of conveyor staves, each stave being formed of light weight metal strip and comprising a body part having two limbs enclosing an angle therebetween to form sprocket engaging surfaces, pins being secured to the upper face of one of said limbs for engaging the fibre, each limb being provided along opposite sides with a slot; and connecting links, each link being formed of flexible material and terminating along its opposite sides with a contractile edge connector for releasable engagement with the slots in an adjacent stave.

4. A lattice conveyor as claimed in claim 3 comprising a connecting link formed along its two opposite sides with a contractile lip for engagement with the slots.

5. In a lattice conveyor for handling fibre, the combination of a series of conveyor staves, each stave being of light weight metal comprising a body part having two limbs set at an angle to each other to provide on their underside sprocket engaging surfaces, one of said limbs having secured to the upper side thereof fibre locating pins, each stave having connector slots along its opposite sides; and connecting links formed of spring metal, by which the staves are flexibly connected to one another, said links having a contractile edge section for engagement with the slots and the staves.

6. A lattice conveyor for handling fibre, being constructed to include alternate rigid staves and resilient links; said links and staves being substantially coextensive with the width of said conveyor; each of said staves including on its upper surface pin means for locating fibre; each of said staves having slots coextensive with each stave edge thereof which is extensive across the width of said conveyor; said resilient links having portions positioned in said slots on opposite sides of said staves; each of said links being formed of resilient material and having along its opposite edge portions means for resiliently engaging the inside portions of said slots throughout the length thereof.

7. The combination of claim 6 wherein said means at the edges of said links are spring portions.

8. The combination of claim 7 wherein said links are constructed of spring steel.

9. The combination of claim 7 wherein said spring portions include at least one substantially reversed bend means in said spring portions for locking engagement of said spring portions within said slots.

References Cited by the Examiner

UNITED STATES PATENTS 3,144,123 8/1964 Wiese _____ 198—149

OTHER REFERENCES

German printed application 1,099,920, February 1961.

EVON C. BLUNK, *Primary Examiner.*

RICHARD E. AEGERTER, *Examiner.*